United States Patent [19]

Boltze et al.

[11] Patent Number: 5,188,571
[45] Date of Patent: Feb. 23, 1993

[54] JOINTED FITTING FOR VEHICLE SEATS, IN PARTICULAR MOTOR VEHICLE SEATS

[75] Inventors: Wolfgang Boltze, Rockenhausen; Werner Wittig, Winnweiler, both of Fed. Rep. of Germany

[73] Assignee: Keiper Recaro GmbH & Co., Fed. Rep. of Germany

[21] Appl. No.: 785,925

[22] Filed: Oct. 31, 1991

[30] Foreign Application Priority Data

Nov. 2, 1990 [DE] Fed. Rep. of Germany ....... 4034843

[51] Int. Cl.$^5$ .............................................. F16H 1/00
[52] U.S. Cl. .................... 475/162; 74/462; 297/362
[58] Field of Search ............... 475/162, 180; 74/462, 74/464; 297/362

[56] References Cited

U.S. PATENT DOCUMENTS

| 81,329 | 8/1868 | Barden | 475/162 |
|---|---|---|---|
| 4,302,047 | 11/1981 | Esser | 297/362 |
| 4,570,510 | 2/1986 | Babak | 475/180 |
| 4,573,739 | 3/1986 | Schottker | 475/180 |
| 4,598,947 | 7/1986 | Fourrey et al. | 297/362 |
| 4,884,844 | 12/1989 | Kershaw et al. | 297/362 |
| 4,916,962 | 4/1990 | Tsutsumi et al. | 297/362 X |
| 5,005,907 | 4/1991 | Caillol | 297/362 |

FOREIGN PATENT DOCUMENTS

| 2615789 | 10/1976 | Fed. Rep. of Germany | 297/362 |
|---|---|---|---|
| 3519441 | 12/1985 | Fed. Rep. of Germany | 297/362 |
| 2560832 | 9/1985 | France | 297/362 |
| 1198737 | 8/1970 | United Kingdom | 475/180 |

OTHER PUBLICATIONS

G. Niemann: Maschinenelemente, 2, Band (2nd vol.) Spring Verlag, 1965, pp. 21, 24, 25, 30, 31, 36, 37 and 38.
Karl-Heinz Decker: Maschinenelemente, 2, Aufl. (2nd Ed.) Carl Hauser Verlag, 1965, pp. 326, 327, 330, 331.
Karl-Heinz Decker: Maschinenelemente, 8, Aufl. Carl Hauser Verlag, 1982, pp. 419, 420.
Dubbels Taschenbuch fur den Maschinenbau, 1, Band 12, Auflage, Springer Verlag, 1966, pp. 724, 725.

*Primary Examiner*—Leslie A. Braun
*Assistant Examiner*—William O. Trousdell
*Attorney, Agent, or Firm*—Wigman & Cohen

[57] ABSTRACT

A jointed fitting is described for vehicle seats comprising a planetary gear enabling the two fitting parts joined by a joint axle to be pivoted relative to each other, a second gear wheel (6) with an external toothing engages a first gear wheel (5) with an internal toothing. Both gear wheels (5, 6) have an involute toothing. Their teeth (7, 8) have a rounded-off head and the number of teeth of the second gear wheel (6) is slightly less than that of the first gear wheel (5). That point on the tooth flanks of the first gear wheel (5) at which the flank section extending along an involute passes into the flank section formed by the rounding-off of the head lies on a circle, the diameter ($d_{el}$) of which is chosen so as to be at least approximately the same as the base circle diameter ($d_{bi}$) of the first gear wheel (5). The top circle diameter ($d_{ai}$) of the first gear wheel (5) is smaller than its base circle diameter ($d_{bi}$).

16 Claims, 2 Drawing Sheets

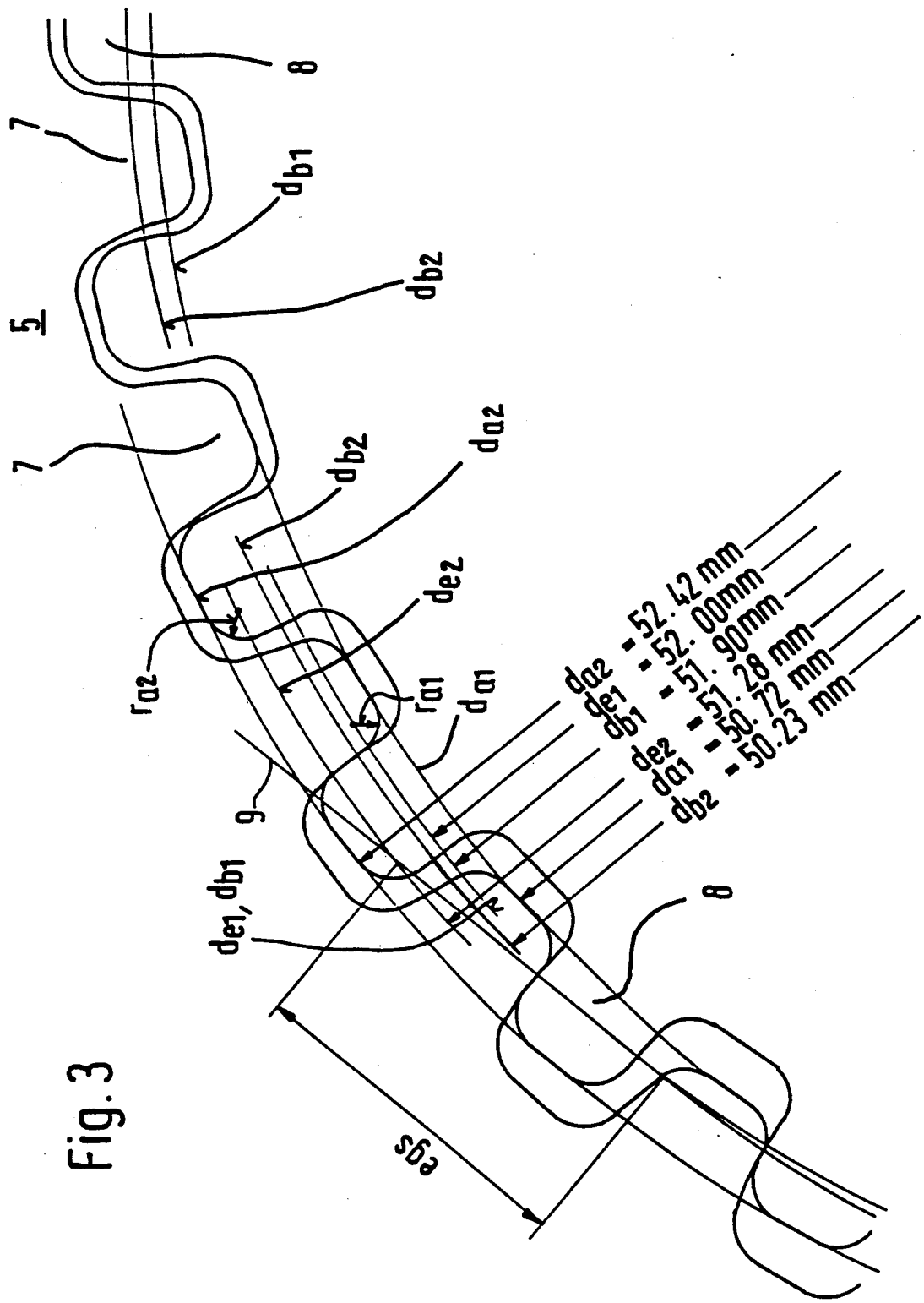

JOINTED FITTING FOR VEHICLE SEATS, IN PARTICULAR MOTOR VEHICLE SEATS

BACKGROUND OF THE INVENTION

Field of the Invention

The invention relates to a jointed fitting for vehicle seats, in particular motor vehicle seats.

In the known jointed fittings of this kind, the involute toothing of both the first gear wheel with internal toothing and the second gear wheel with external toothing is designed in accordance with the generally accepted principles for involute toothings of gears. For an involute internal toothing, for example, the principle applies that the base circle diameter must be smaller than the top circle diameter or may at the most be equal to the top circle diameter. Because the teeth of the two gear wheels in jointed fittings for vehicle seats are not milled and/or ground, but stamped, the transition from the tooth flank to the head surface cannot be made to include an edge. Instead the teeth must be made with rounded-off heads in order for the stamping tool to have an adequate service life. However, this rounding-off of the heads results in loss of a substantial part of the section of the tooth flanks extending along an involute. This adversely affects the stability of the gear under load and its running performance. To compensate the reduction in the section of the tooth flanks extending along an involute by the rounding-off of the heads, one has heretofore enlarged the teeth and hence also the gear wheels, but this increases the space requirement for the jointed fitting, which, in turn, is inconvenient.

OBJECTS AND SUMMARY OF THE INVENTION

The object underlying the invention is, therefore, to improve a jointed fitting of the kind in question with respect to its running performance and its stability under load without having to raise the expenditure and increase the space requirement.

Other objects and advantages will become apparent from the description and claims which follow.

Owing to the fact that contrary to the principle applicable to the choice of the top circle diameter and the base circle diameter in an involute internal toothing, the top circle diameter of the internal toothing of the first gear wheel is chosen smaller than the base circle diameter and, furthermore, that point on the tooth flanks of the first gear wheel at which the flank section extending along an involute passes into the flank section formed by the rounding-off of the head lies on a circle, the diameter of which is selected so as to be at least approximately the same as the base circle diameter of the toothing of the first gear wheel, the involute begins at least approximately at the point where the rounding-off of the head also begins. Therefore, in the solution according to the invention, the rounding-off of the head does not result in part of the tooth flank following the involute being lost owing to the rounding-off of the head. Since the difference in the number of teeth in jointed fittings of the kind in question is extremely small, it is, furthermore, advantageous for the inventive design of the toothing to enable enlargement of the operational angle of action and a greater degree of involute coverage. This is important, particularly in view of the relatively large tooth depths commonly used on the gear wheels of jointed fittings, to achieve freedom of interference, i.e., to ensure that the teeth will roll off on one another only in the region of the tooth flank sections following an involute. Further advantages of the inventive jointed fitting are a more uniform gear ratio and improved running performance of the gear, more uniform gearing efficiency, more uniform driving torque and greater static stability of the gear, the latter being due to the larger effective tooth surface and the greater tooth coverage with possible deformation.

The rounding-off of the head of the teeth on the first gear wheel is preferably defined by a radius. Such rounding-off of the head is also advantageous on the teeth of the second gear wheel, the teeth of which may have a profile which complies with the hitherto valid principles because in this case the base circle of the toothing extends in the foot region of the teeth and, therefore, the rounding-off of the head does not lead to the section of the tooth flanks defined by the start of the involute being lost owing to the rounding-off of the head.

The invention is explained in detail hereinbelow with reference to an embodiment illustrated in the drawings wherein the drawings show:

FIG. 1 a view of the embodiment,

FIG. 2 an incomplete, enlarged illustration of the toothing of the two fitting parts of the embodiment, and FIG. 3 an enlarged illustration of a section taken from FIG. 2.

DETAILED DESCRIPTION OF A PREFERRED EMBODIMENTS

Figure 1:
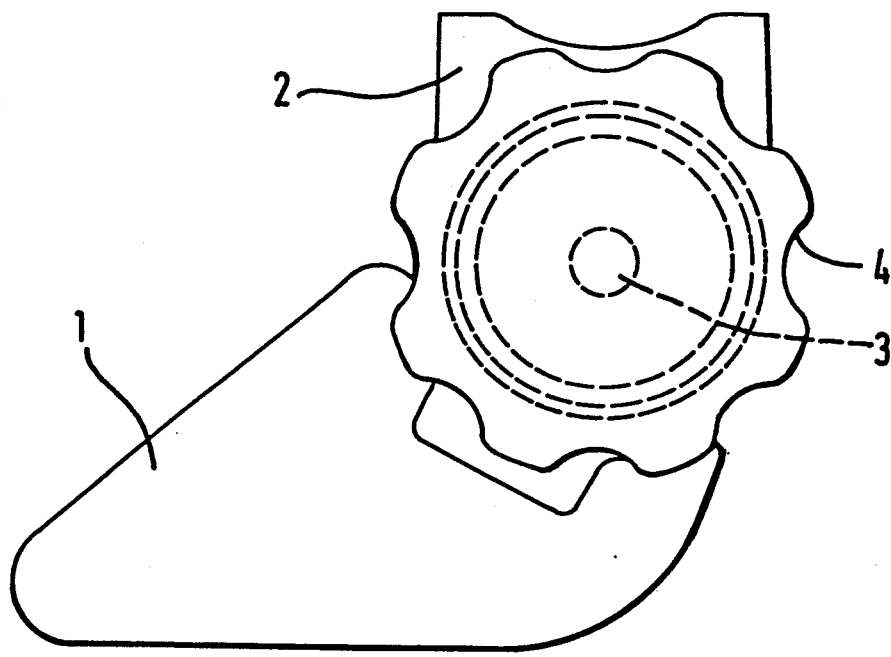

In FIG. 1, there is shown a jointed fitting for pivotal and fixable connection of the back of a vehicle seat, in particular a motor vehicle seat, with its seat part in a selectable pivotal position consists in a known manner of a lower fitting part 1 and an upper fitting part 2. The former is connected to the seat part, the latter to the upholstery backing of the back. A joint axle 3 which, in the present embodiment, has a handwheel 4 fixedly arranged on it provides a pivotal connection between the lower fitting part 1 and the upper fitting part 2. The joint axle 3 also forms the drive shaft for a planetary gear by means of which the upper fitting part 2 can be pivoted relative to the lower fitting part 1 by turning the handwheel 4. Insofar as the planetary gear is self-locking, it also holds the upper fitting part 2 in the adjusted pivotal position.

Figure 2:
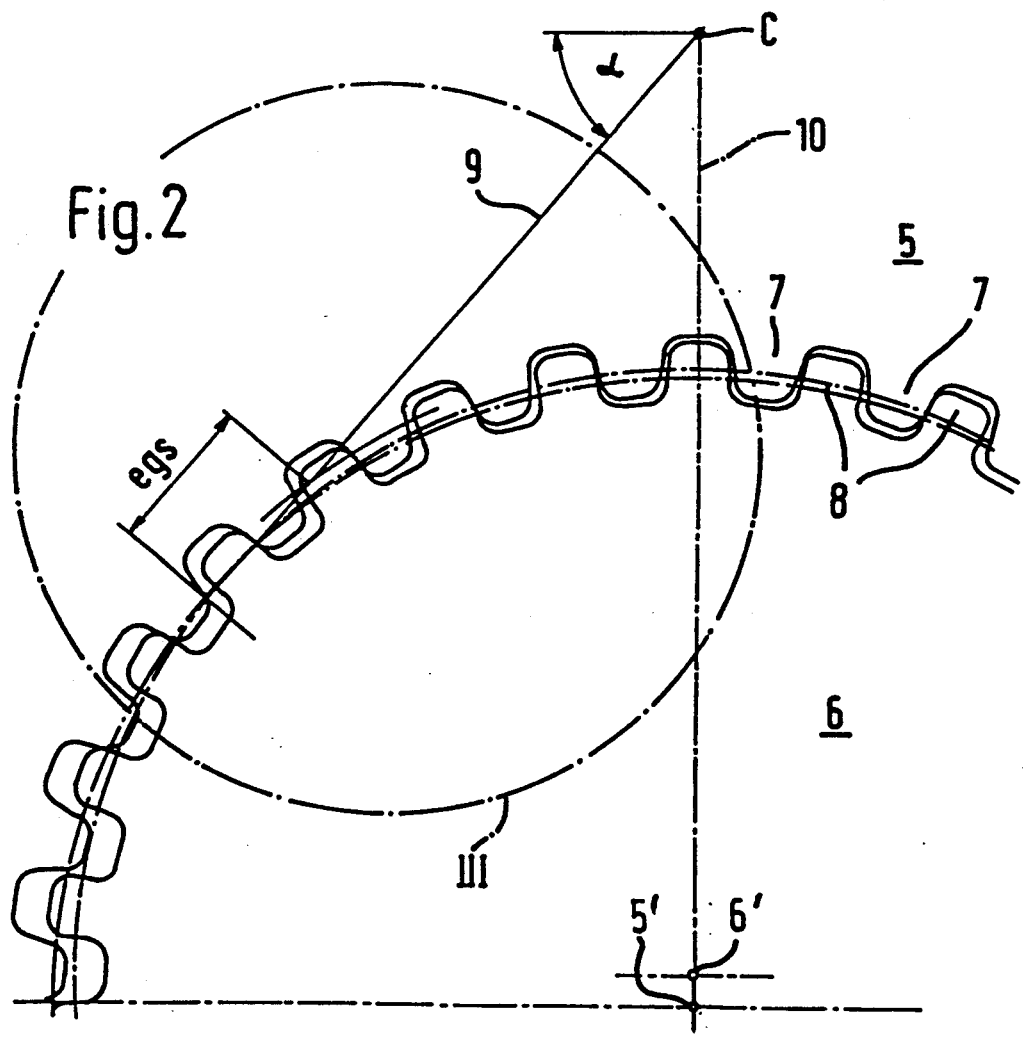

The planetary gear consists of an internally toothed first gear wheel 5 arranged concentrically with the joint axle 3 and of an externally toothed second gear wheel 6, the toothing of which engages the internal toothing of the first gear wheel 5. The axis of rotation of the second gear wheel 6 is arranged eccentrically with respect to the axis of rotation of the first gear wheel 5, as shown in FIG. 2, where the axis of rotation 6' of the second gear wheel 6 which moves on a circular path about the axis of rotation 5' of the first gear wheel 5 is illustrated just above the axis of rotation 5'. In the present embodiment, the two gear wheels 5 and 6 are integrally formed in a known manner on the lower fitting part 1 and the upper fitting part 2, respectively. The latter is, therefore, mounted for rotation on an eccentric of the joint axle 3. As the motion of the axis of rotation 6' about the axis of rotation 5' therefore overrides a pivotal motion of the upper fitting part 2, such a fitting is also referred to as wobble fitting.

The internal toothing of the first gear wheel 5 and likewise the external toothing of the second gear wheel 6 are designed as involute toothing. The teeth of the first gear wheel 5 are designated 7 and those of the second gear wheel 6 are designated 8. The second gear wheel 6 has thirty teeth, a base circle diameter $d_{b2}$ of 50.23 mm and a top circle diameter $d_{a2}$ of 52.42 mm. That point on each tooth flank of the teeth 8 at which the flank section following the involute starts and extends towards the head end of the tooth lies on a circle, the diameter $d_{e2}$ of which, also referred to as diameter of the involute, is 51.28 mm. The radius $r_{a2}$ of the rounding-off of the head is 0.70 mm and the tooth depth 2.46 mm.

With a spacing of 1.3 mm between the two axes of rotation 5' and 6', the first gear wheel 5 has thirty one teeth. Its base circle diameter $d_{b1}$ is 51.90 mm. That point on each tooth flank of the first teeth 7 at which the flank section defined by the involute starts and extends towards the foot end of the tooth lies on a circle, the diameter $d_{e1}$ of which, also referred to as diameter of the involute, is 52.00 mm. The top circle diameter $d_{a1}$ is 50.72 mm, the radius $r_{a1}$ of the rounding-off of the head 0.70 mm. This radius adjoins the actual start of the involute defined by the diameter $d_{e1}$ of the involute. The theoretical start of the involute is defined by the base circle. The radius of the rounding of the foot is 0.80 mm on both toothings.

Hence the diameter $d_{e1}$ of the involute of the internal toothing of the first gear wheel 5 is chosen so as to be almost the same as the base circle diameter $d_{b1}$ pertaining to this toothing, which essentially results in the improved characteristics of the jointed fitting. The associated area of engagement within which the tooth engagement takes place is marked off in FIG. 3 on the line of action 9 and designated "egs".

FIG. 2, in which the area of engagement "egs" is likewise illustrated, also shows the pitch point C at the point where the straight line 10 defined by the two axes of rotation 5' and 6' intersects the line of action 9.

Also illustrated is the angle of action $\alpha$ which the tangent to the two pitch circles touching at the pitch point C includes with the line of action 9—the two pitch circles not being show herein. Since the angle of action $\alpha$ of 49.9° is relatively large, the pitch point C lies far outside of the toothing.

The degree of involute coverage is 0.865.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Jointed fitting for vehicle seats, in particular motor vehicle seats, comprising a planetary gear enabling the two fitting parts joined by a joint axle to be pivoted relative to each other, said planetary gear having a first gear wheel with an internal toothing and a second gear wheel with an external toothing engaging said first gear wheel, both gear wheels having an involute toothing, at least the teeth of said first gear wheel having a rounded-off head and the number of teeth of said second gear wheel being slightly less than that of said first gear wheel, wherein;
    a) that point on the tooth flanks of said first gear wheel at which the flank section extending along an involute passes into the flank section formed by the rounding-off of the head lies on a circle, the diameter of which is selected so as to be at least approximately the same as the base circle diameter of said first gear wheel, and
    b) the top circle diameter of said first gear wheel is smaller than its base circle diameter.

2. Jointed fitting as defined in claim 1, wherein the rounding-off of the head of said internal teeth adjoining the one end of the involute at least on the toothing of said first gear wheel is defined by a radius.

3. Jointed fitting as defined in claim 1, wherein said internal teeth and said external teeth are formed by stamping.

4. Jointed fitting as defined in claim 1, wherein said first gear wheel comprises 31 teeth and said second gear wheel comprises 30 teeth.

5. Jointed fitting as defined in claim 1, having an angle of action of approximately 49.9 degrees.

6. Jointed fitting as defined in claim 1, having a degree of involute coverage of approximately 0.865.

7. Jointed fitting as defined in claim 1, having a rounding off of the teeth of both said internal and external toothings having an approximate radius of 0.70 mm, said toothings each having a foot having an approximate radius of 0.80 mm, and an internal tooth depth of approximately 2.46 mm.

8. Jointed fitting for vehicle seats, in particular motor vehicle seats, comprising a planetary gear enabling the two fitting parts joined by a joint axle to be pivoted relative to each other, said planetary gear having a first gear wheel with an internal toothing and a second gear wheel with an external toothing engaging said first gear wheel, both gear wheels having an involute toothing, said first gear wheel involute toothing defined by a first base circle diameter ($d_{b1}$), a first involute circle diameter ($d_{e1}$) and a first top circle diameter ($d_{a1}$), said second gear wheel involute toothing defined by a second base circle diameter ($d_{b2}$), a second involute circle diameter ($d_{e2}$), and a second top circle diameter ($d_{a2}$), at least the teeth of said first gear wheel having a rounded-off head and the number of teeth of said second gear wheel being at least one less that that of said first gear, wherein said circle diameters are in ascending sequence, as follows: $d_{b2}$, $d_{a1}$, $d_{e2}$, $d_{b1}$, $d_{e1}$ and $d_{a2}$.

9. Jointed fitting as defined in claim 8, wherein said circle diameters are in the following approximate ratios:

$d_{a1}:d_{b1} = 0.9754$,
$d_{e1}:d_{b1} = 1.0000$,
$d_{a2}:d_{b2} = 1.0436$,
$d_{e2}:d_{b2} = 1.0209$,
$d_{b1}:d_{b2} = 1.0352$, based upon a first base circle diameter ($d_{b1}$) in the range of approximately 51.90 to 52.00 millimeters.

10. Jointed fitting as defined in claim 8, wherein said internal teeth and said external teeth have rounded-off heads.

11. Jointed fitting as defined in claim 8, wherein said internal teeth and said external teeth are formed by stamping.

12. Jointed fitting as defined in claim 8, wherein said circle diameters are approximately as follows:

$db_2 = 50.23$ mm,
$da_1 = 50.72$ mm,
$de_2 = 51.28$ mm,
$db_1 = 51.90$ mm,
$de_1 = 52.00$ mm, and
$da_2 = 52.42$ mm.

13. Jointed fitting as defined in claim 8, wherein said first gear wheel comprises 31 teeth and said second gear wheel comprises 30 teeth.

14. Jointed fitting as defined in claim 8, having an angle of action of approximately 49.9 degrees.

15. Jointed fitting as defined in claim 8, having a degree of involute coverage of approximately 0.865.

16. Jointed fitting as defined in claim 8, having a rounding off of the teeth of both said internal and external toothings having an approximate radius of 0.70 mm, said toothings each having a foot having an approximate radius of 0.80 mm, and an internal tooth depth of approximately 2.46 mm.

* * * * *